(12) United States Patent  (10) Patent No.: US 8,880,565 B2
Fricke et al.  (45) Date of Patent: Nov. 4, 2014

(54) TABLE CREATION FOR PARTITIONED TABLES

(75) Inventors: Lars Fricke, Worms (DE); Christian Bensberg, Heidelberg (DE)

(73) Assignee: SAP SE, Walldorf (DE)

( * ) Notice: Subject to any disclaimer, the term of this patent is extended or adjusted under 35 U.S.C. 154(b) by 284 days.

(21) Appl. No.: 13/336,942

(22) Filed: Dec. 23, 2011

(65) Prior Publication Data

US 2013/0166606 A1 Jun. 27, 2013

(51) Int. Cl.
*G06F 17/30* (2006.01)

(52) U.S. Cl.
USPC ........... 707/803; 707/737; 707/758; 707/782; 707/E17.054

(58) Field of Classification Search
CPC .................... G06F 17/30584; G06F 17/30705; G06F 17/30545; G06F 17/30424; G06F 17/30442; G06F 17/30595; G06F 17/30979; G06F 9/5061
USPC ......................................... 707/736–782, 803
See application file for complete search history.

(56) References Cited

U.S. PATENT DOCUMENTS

| | | | |
|---|---|---|---|
| 6,772,163 B1 * | 8/2004 | Sinclair et al. ......................... | 1/1 |
| 6,775,673 B2 * | 8/2004 | Mahalingam et al. ................ | 1/1 |
| 6,910,044 B2 * | 6/2005 | Weinberg et al. ............. | 707/792 |
| 7,599,910 B1 * | 10/2009 | Tsuchida et al. ....................... | 1/1 |
| 7,685,109 B1 * | 3/2010 | Ransil et al. ............ | 707/999.003 |
| 7,734,615 B2 * | 6/2010 | Anderson et al. ............. | 707/713 |
| 7,779,045 B2 * | 8/2010 | Mohamed et al. ............ | 707/802 |
| 7,930,294 B2 * | 4/2011 | Shuf et al. ..................... | 707/713 |
| 7,949,687 B1 * | 5/2011 | Sinclair ......................... | 707/803 |
| 8,005,836 B2 * | 8/2011 | Ramesh et al. ................ | 707/736 |
| 8,290,919 B1 * | 10/2012 | Kelly et al. .................... | 707/698 |
| 2005/0187977 A1 * | 8/2005 | Frost .......................... | 707/104.1 |
| 2010/0106934 A1 * | 4/2010 | Calder et al. .................. | 711/173 |

* cited by examiner

*Primary Examiner* — Michelle Owyang
(74) *Attorney, Agent, or Firm* — Mintz Levin Cohn Ferris Glovsky and Popeo, P.C.

(57) ABSTRACT

A table creation request pertaining to a table in a database maintained on a multi-node data partitioning landscape that comprises a plurality of processing nodes can specify a number of partitions to be generated. At run time, a currently available number of processing nodes in the multi-node data partitioning landscape can be queried, and this currently available number of processing nodes can be compared with the specified number of partitions to be generated for the created table. The table can be generated with the specified number of partitions such that the generated partitions are located across the plurality of partitions according to a load balancing approach if the number of processing nodes equals the number of partitions to be generated or according to other information in the table request if the number of processing nodes does not equal the specified number of partitions.

13 Claims, 9 Drawing Sheets

TABLE CREATION FOR PARTITIONED TABLES

TECHNICAL FIELD

The subject matter described herein relates to manipulations of partitioned database tables, including but not limited to creation of partitioned tables.

BACKGROUND

In recent years, central processing units (CPUs) of computer processing hardware have generally experienced their greatest performance increases by increasing the number of processor cores rather than through increasing clock rates. Accordingly, to maximize performance, modern software advantageously employs the benefits of multi-core CPUs by allowing parallel execution and with architectures that scale well with the number of cores. For data management systems, taking full advantage of parallel processing capabilities generally requires partitioning of stored data into sections or "partitions" for which the calculations can be executed in parallel.

A database program or database management system generally displays data as two-dimensional tables, of columns and rows. However, data are typically stored as one-dimensional strings. A row-based store typically serializes the values in a row together, then the values in the next row, and so on, while a column-based store serializes the values of a column together, then the values of the next column, and so on.

In general, column-based systems are more efficient when an aggregate needs to be computed over many rows but only for a notably smaller subset of all columns of data, because reading that smaller subset of data can be faster than reading all data. Column-based systems can be more efficient when new values of a column are supplied for all rows at once, because that column data can be written efficiently and replace old column data without touching any other columns for the rows. Row-based systems can be more efficient when many columns of a single row are required at the same time, and when row-size is relatively small, as the entire row can be retrieved with a single disk seek. Row-based systems can also be more efficient when writing a new row if all of the column data is supplied at the same time, as the entire row can be written with a single disk seek.

Column-based storage can facilitate execution of operations in parallel using multiple processor cores. In a column store, data are already vertically partitioned, so operations on different columns can readily be processed in parallel. If multiple columns need to be searched or aggregated, each of these operations can be assigned to a different processor core. In addition, operations on one column can be parallelized by partitioning the column into multiple sections that are processed by different processor cores. Column data is typically of uniform type, which can facilitate opportunities for storage size optimizations available in column-based data stores that are not available in row-based data stores. For example, some modern compression schemes can make use of the similarity of adjacent data to compress. To improve compression of column-based data, typical approaches involve sorting the rows. For example, using bitmap indexes, sorting can often improve compression by approximately an order of magnitude. In conventional systems, columnar compression generally achieves a reduction in storage space requirements at the expense of efficiency of retrieval. Retrieving all data from a single row can be more efficient when that data is located in a single location, such as in a row-based architecture. Further, the greater adjacent compression achieved, the more difficult random-access may become, as data typically need to be uncompressed to be read. Therefore, conventional column-based architectures are often enriched by additional mechanisms aimed at minimizing the need for access to compressed data. These additional mechanisms can result in lower compression efficiency and/or increased processing requirements to access the compressed data.

Currently available relational database management systems can accomplish partitioning based on specified criteria applied to split the database. In general, a partitioning key is used to assign a partition based on certain criteria. Commonly used approaches include range partitioning, list partitioning, hash partitioning, round robin partitioning, and composite partitioning. In range partitioning, a partition can be defined by determining if the partitioning key is inside a certain range. For example, a partition can be created to include for all rows in which values in a column of postal codes are between 70000 and 79999. In list partitioning, a partition can be assigned a list of values and the partition can be chosen if the partitioning key has one of the values on the list. For example, a partition built to include data relating to Nordic countries can includes all rows in which a column of country names includes the text string values Iceland, Norway, Sweden, Finland, Denmark, etc. In hash partitioning, the value of a hash function can determine membership in a partition. For example, for a partitioning scheme in which there are four partitions, the hash function can return a value from 0 to 3 to designate one of the four partitions. Round robin partitioning can be used to distribute storage and/or processing loads among multiple data partitions and/or servers or server processes according to a pre-set rotation among the available partitions or servers or server processes. As an example, a first data unit can be directed to a first partition of three partitions, a second data unit to the second partition, a third data unit to the third partition, a fourth data unit to the first partition, and so forth. In composite partitioning, certain combinations of other partitioning schemes can be allowed, for example by first applying a range partitioning and then a hash partitioning.

SUMMARY

In one aspect, a method includes receiving a table creation request pertaining to a table in a database maintained on a multi-node data partitioning landscape that includes a plurality of processing nodes. The table creation request includes a number of partitions to be generated for the table. A currently available number of processing nodes in the multi-node data partitioning landscape is queried and comparing with the specified number of partitions to be generated for the created table. The table is generated with the specified number of partitions such that the generated partitions are located across the plurality of partitions according to a data load balancing partitioning specification if the currently available number of processing nodes equals the specified number of partitions to be generated or according to other information in the table request if the currently available number of processing nodes does not equal the specified number of partitions to be generated. Alternatively, the table creation request does not specify a fixed number of partitions, but a parameter, which is set at run-time to the number of available nodes in the landscape.

In some variations of the current subject matter, one or more of the following features can optionally be included in any feasible combination. The other information in the table request can optionally include semantic information regarding relationships between data in the partitions to be created. Additional operations can optionally include a recipient node of the plurality of processing nodes receiving a first data request received directly from a requesting machine without being handled by a master node, identifying a target node of the plurality of processing nodes to handle the data request at least in part by applying partitioning information to determine one partition of the plurality of partitions to which the data request should be directed and mapping information associating each data partition of the plurality of data partitions with an assigned node of the plurality of processing nodes, and redirecting the data request to the target node so that the target node can act on the one partition in response to the data request. The partitioning information and the mapping information can optionally be accessed from at least one of a local storage accessible to the recipient node and a metadata repository accessible to each of the plurality of processing nodes. The plurality of partitions can optionally include part of a multi-node data partitioning landscape comprising data partitioning over at least two partitioning levels. The table can optionally be further partitioned at a first level using a first partitioning specification and at a second level using a second partitioning specification. The table can optionally be further partitioned at a first level into at least two first level partitions based on a first partitioning method. Each of the first level partitions can optionally be further partitioned at a second level into two or more second-level partitions based on a second partitioning method that is the same for all of the at least two first level partitions.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A multi-node data partitioning landscape can include multiple processing nodes, each of which can be physical servers each including one or more programmable processors, server processes (e.g. virtual machines spread across one or more physical machines), a combination of physical and virtual processors, or the like. When a table is created in a multi-node data partitioning landscape, it is necessary to have a mechanism for specifying the data partitions in which the table will be stored. The table can of course be moved to different partitions subsequent to its creation.

In conventional approaches, a creation statement for a table includes specific, hard-coded information about how the table is to be partitioned and the partitions distributed over nodes upon which those data partitions are located. However, in a dynamic partitioning environment, in which the number and location of available data partitions can change, a rigid structure for assigning a newly created table to data partitions and processing nodes can be less desirable.

Figure 1A:
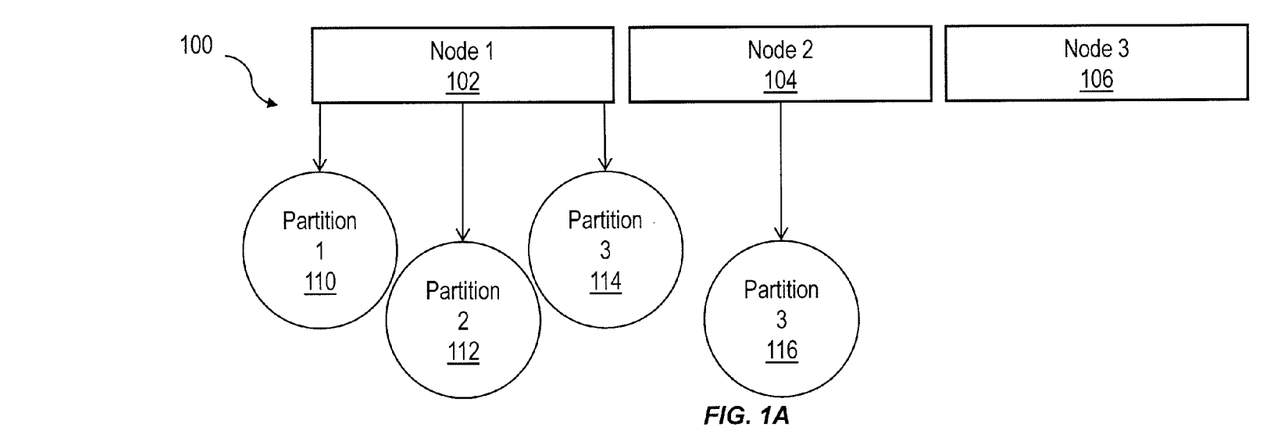
FIG. 1A and FIG. 1B are diagrams illustrating first and second examples of creation of table partitions in a multi-node data partitioning landscape.

FIG. 1A shows a diagram illustrating an example of a multi-node data partitioning landscape 100 that includes a first processing node 102, a second processing node 104, and a third processing node 106. In this example, a newly created table 110 is created by a CREATE (e.g. in SQL) statement that specifies that that the table should be split into four parts, and that three of the partitions 110, 112, 114 should reside on the first processing node 102 while the fourth partition 116 should reside on the second processing node 104 and no partitions will be directed to the third processing node 106.

Implementations of the current subject matter can support optimization of a balance between two potentially competing concerns that can arise in a multi-node, parallel processing environment. First, it can be desirable to ensure that the available processing nodes each receive an approximately equally distribution of the overall data storage load. Such a distribution can ensure the most efficient use of resources assuming that all data stored in the system are equally likely to be accessed. A second consideration, however, can involve keeping semantically related or otherwise correlated data on the same processing node such that all data that are likely to be required in a given type of query can be retrieved form a single processing node without requiring excessive data traffic between processing nodes.

Methods, systems, articles of manufacture, and the like consistent with, one or more implementations of the current subject matter can, among other possible advantages, provide an improved approach to table creation, in which table creation requests that do not specify a desired structure of data partition locations or that specify a number of partitions that is equal to a number of available processing nodes are treated in one manner to maximize overall data load distribution among the available processing nodes while table creation requests that specify a structure that deviates from a fully distributed partitioning scheme are assumed to relate to some need to group related data on a same processing node.

As an example, a CREATE statement to identify processing nodes to which the created partitions of a table are directed can be explicit in the identification of servers or, alternatively can merely indicate that certain of the to-be-created partitions should reside on the same processing node. If the specified number of partitions is equivalent to a specified number of processing nodes to which the partitions are to be assigned but no specific partition grouping or processing node addressing is supplied, then the table creation request can be treated as a simple load balancing issue. The created partitions can be distributed by one or more pre-set partitioning specifications designed to maximize the even distribution of data across the available processing nodes. Examples of a pre-set partitioning specification that can be used in this manner can include, but are not limited to round robin partitioning, randomized partitioning, and the like. While the goal of even data distribution may not be achieved for any single table creation request, through consistent application of the one or more pre-set partitioning specifications for multiple successive table creation requests, an overall load balancing can be achieved.

Semantically related tables can be created in multiple CREATE calls. Therefore the server may not know about their dependency, and some kind of indication can be required to indicate that the table partitions should be created in such a way that semantically related data resides on the same node (e.g. server, server process, etc.). In some implementations, this aspect can be achieved by using a) the same kind of partition specification for each node and having the number of parts match the number of processing nodes. In this manner, the partitions are created with one partition per node.

Figure 1B:
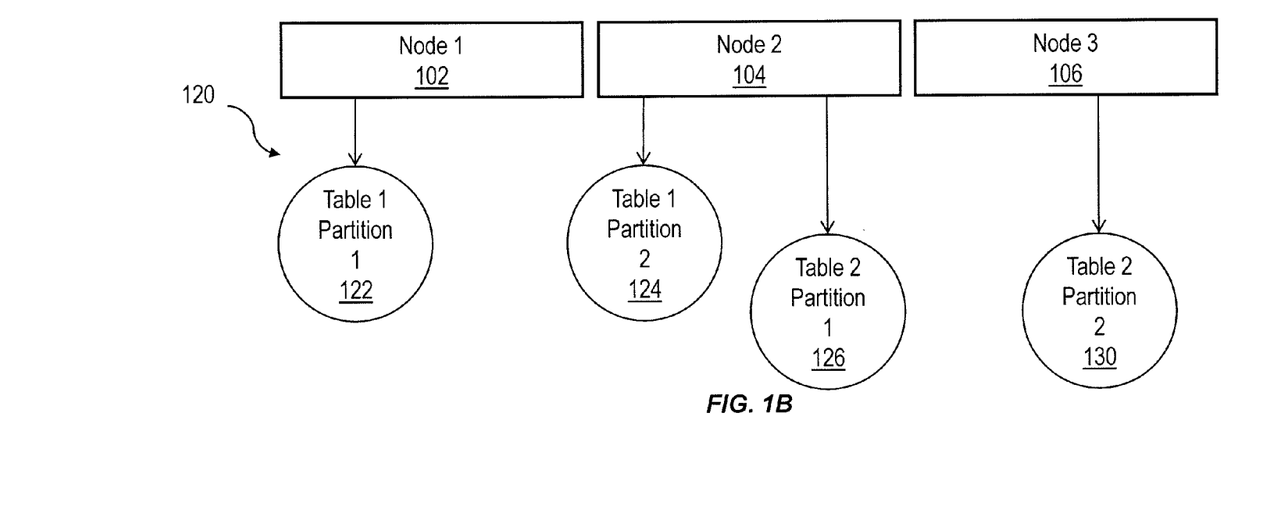

If the number of partitions does not match, it can be assumed that there are no related tables. In this case, the partitions can be distributed evenly over the landscape, which may still result in either a) nodes having more partitions or b) some having none. In such a scenario it can be important that multiple CREATE calls do not locate new partitions only on the same nodes. Therefore a randomization can be used that can statistically distribute partitions of multiple tables over the landscape evenly. In the example landscape 120 illustrated in FIG. 1B, the first CREATE table call creates two partitions 122 and 124 of a first table on the first node 102 and the second node 104, respectively. The second CREATE call creates two partitions 126 and 130 on the second node 104 and the third node 106, respectively. For both calls in this example, the nodes of the first partition 122 of the first table were determined via randomization. All further node locations were then evaluated by picking the next nodes from the configuration.

Alternatively, if the table creation request does specify one or more of specific processing node location structures or definitions of semantic groupings that are desired for the created partitions, the tables can be created with a partitioning scheme consistent with the constraints provided with or within the creation request. In this manner, tables and/or table partitions that are semantically related can be more readily collocated on a smaller number of processing nodes. Data can be maintained on a same processing node (e.g. a server or server process) as other data that are logically related to it. In further variations, the number of available processing nodes need not be hard-coded, but can instead be determined dynamically, for example at run time (e.g. at the time the table creation request is received).

Figure 2:
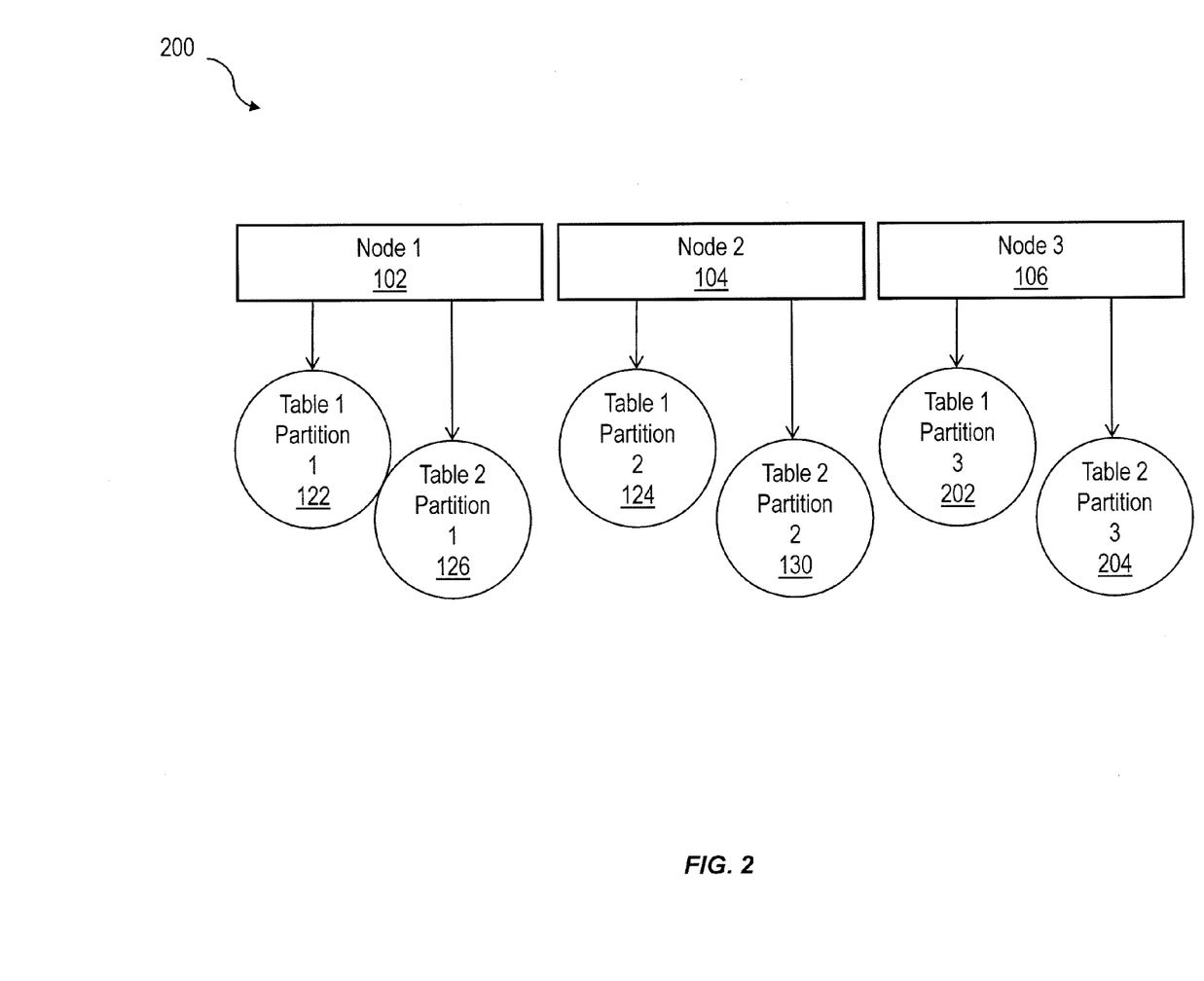
FIG. 2 is a diagram illustrating an additional example of creation of table partitions in a multi-node data partitioning landscape.

FIG. 2 shows a diagram illustrating an example of an approach to creating partitions of two semantically related tables across a multi-node data partitioning landscape 200. As shown in FIG. 2, the first partitions 122, 126, respectively, of the first and second tables can be located on the first processing node 102, the second partitions 124, 130, respectively, of the first and second tables can be located on the second processing node 104, and third partitions 202, 204, respectively, of the first and second tables can be located on the third processing node 106. In this manner, the related partitions of the two tables are each co-located at a same processing node, which can substantially reduce cross-node data traffic for data requests that reference related data across the two tables.

Figure 3:
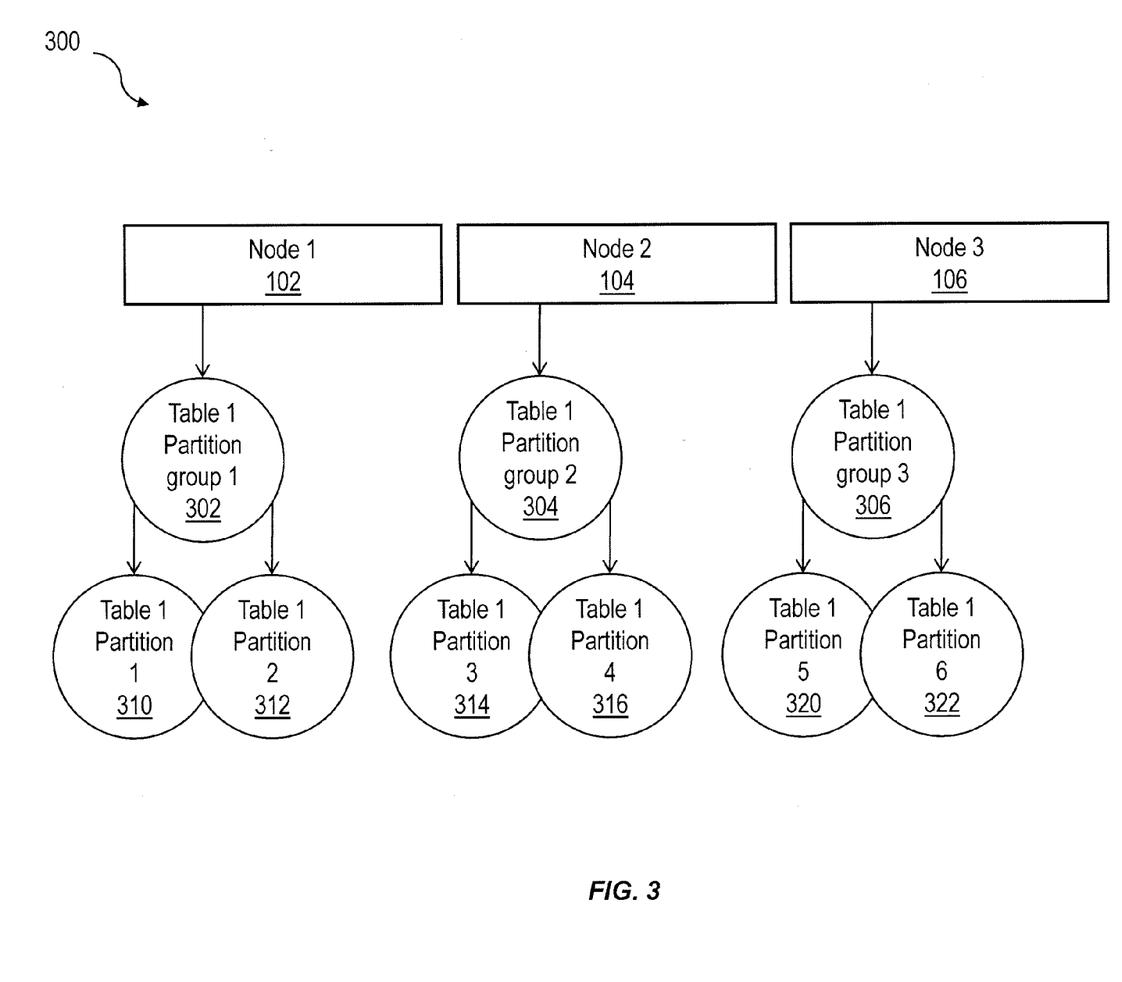
FIG. 3 is a diagram illustrating yet another an additional example of creation of table partitions in a multi-node data partitioning landscape.

FIG. 3 shows a diagram illustrating an example of an approach to creating grouped partitions (as they occur with a multi-level partitioning, such as for example consistent with features discussed in greater detail below) of a table across a multi-node data partitioning landscape 300. As shown in FIG. 3, the first, second, and third processing nodes 102, 104, 106 are assigned a first table partition group 302, a second table partition group 304, and a third table partition group 306, respectively. The first table partition group 302 includes grouped first and second partitions 310, 312 of the table, while the second table partition group 304 includes grouped third and fourth partitions 314, 316 of the table, and the third table partition group 306 includes grouped fifth and sixth partitions 320, 322 of the table. An approach similar to that illustrated in the example of FIG. 3 can ensure that groups of partitions that are related can be created properly. A group, which can be a logical construct (e.g. having no "physical" counterpart) can be restricted to not span across multiple processing nodes.

Figure 4:
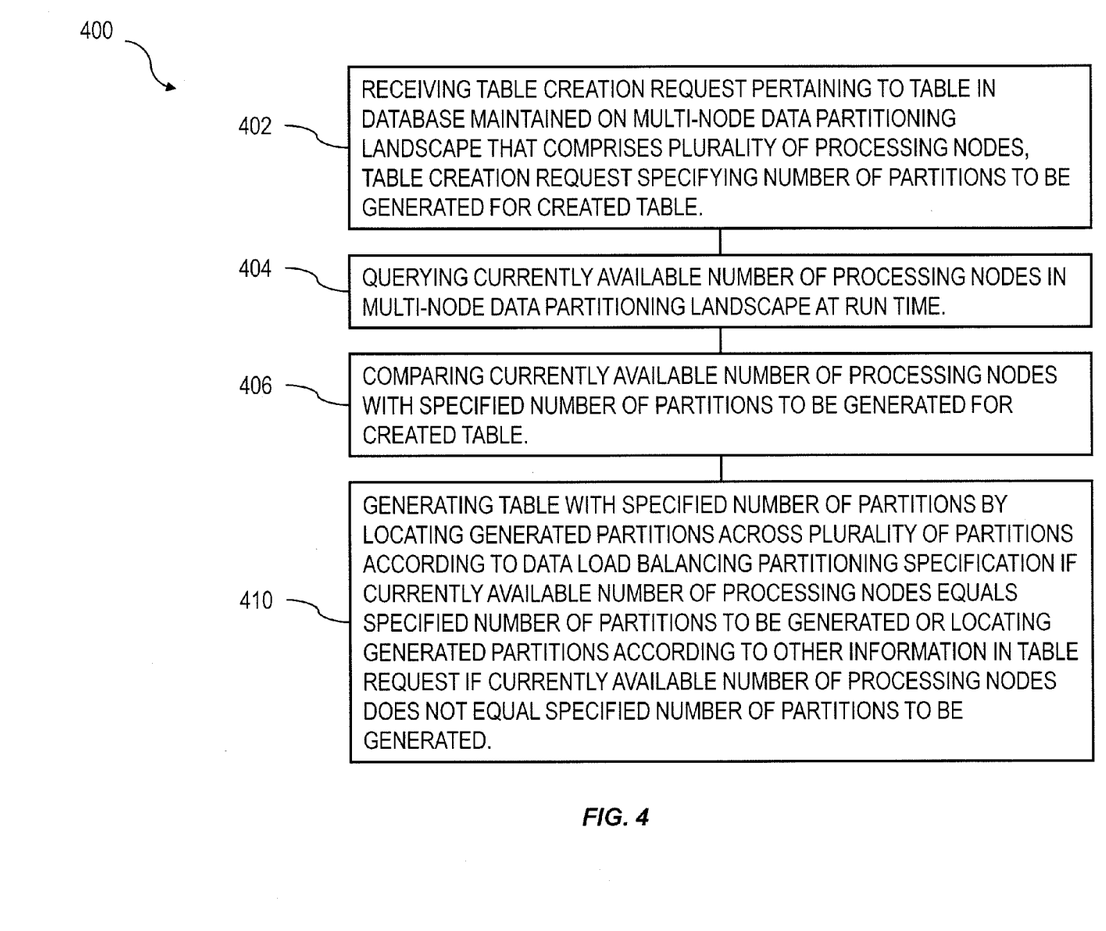
FIG. 4 is a process flow diagram illustrating aspects of a method having one or more features consistent with at least some implementations of the current subject matter.

FIG. 4 shows a process flow chart 200 illustrating method features, one or more of which can be included in implementations of the current subject matter. At 402, a table creation request pertaining to a table in a database maintained on a multi-node data partitioning landscape is received. The multi-node data partitioning landscape includes a plurality of processing nodes. The table creation request includes at least one parameter that specifies a number of partitions to be generated for the created table. At 404, a currently available number of processing nodes in the multi-node data partitioning landscape is queried at run time. For example, a database controller or other database management agent or database manager can be requested to provide the currently available number of processing nodes. The currently available number of processing nodes is compared with the specified number of partitions to be generated for the created table at 206, and the specified number of partitions is generated at 410. The generating includes locating the generated partitions across the plurality of partitions according to a data load balancing partitioning specification if the currently available number of processing nodes equals the specified number of partitions to be generated or locating the generated partitions according to other information in the table request if the currently available number of processing nodes does not equal the specified number of partitions to be generated. In other words, as noted above, if the location is not specified in the CREATE statement, partitions are generally assigned according to some partitioning criteria, such as for example a round robin scheme, random partitioning (e.g. using a hash function or the like), etc.

Figure 5:
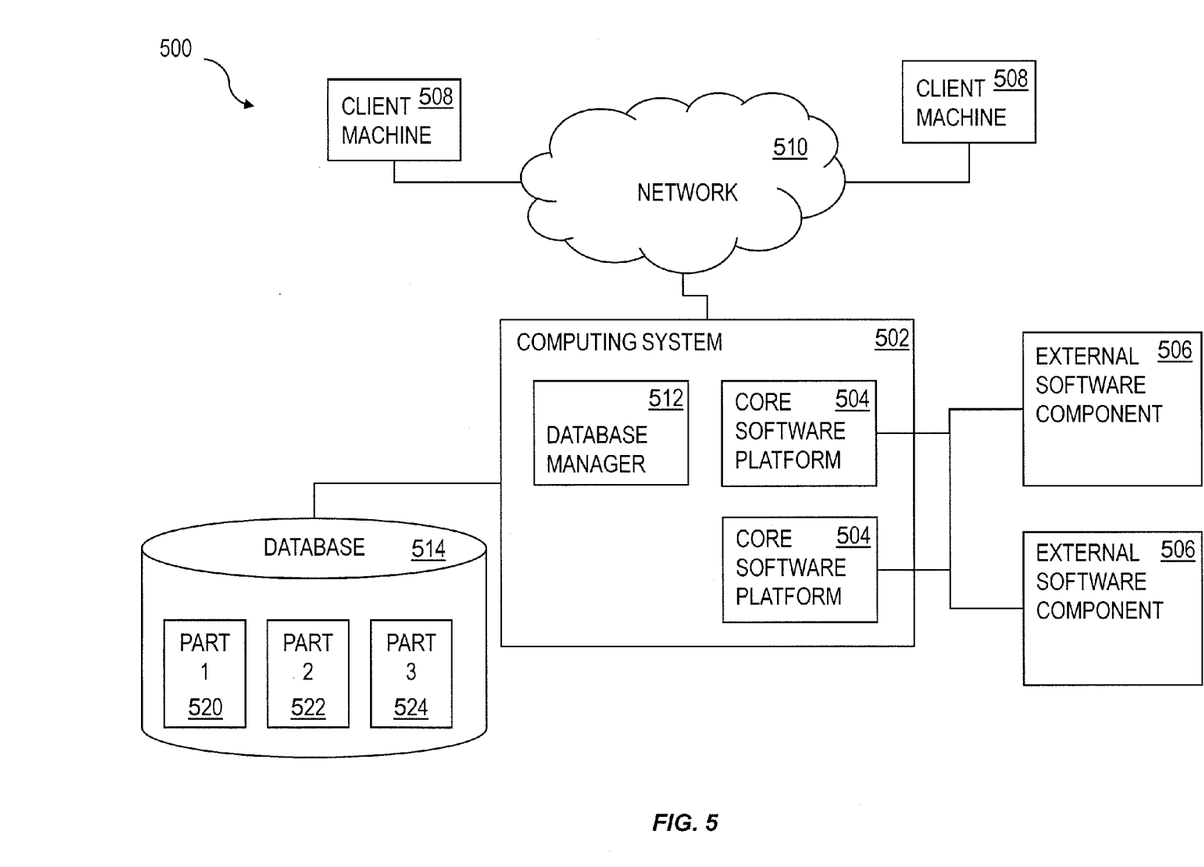
FIG. 5 is a diagram illustrating features of a business software system architecture consistent with at least some implementations of the current subject matter.

FIG. 5 shows a diagram of a system that can implement one or more features of the current subject matter. A computing system 502 can include one or more core software platform modules 504 providing one or more features of a business software system or other software that includes database management features. The computing system can also aggregate or otherwise provide a gateway via which users can access functionality provided by one or more external software components 506. One or more client machines 508 can access the computing system, either via a direct connection, a local terminal, or over a network 510 (e.g. a local area network, a wide area network, a wireless network, the Internet, or the like).

A database manager or a database management agent 512 or other comparable functionality can access a database 514 that includes at least one table 516, which can in turn include at least one column. The database manager 512 can implement one or more table creation algorithms that causes one or more processors of the computing system to perform one or more of the functions described herein. The database table can store any kind of data, potentially including but not limited to definitions of business scenarios, business processes, and one or more business configurations as well as transactional data, metadata, master data, etc. relating to instances or definitions of the business scenarios, business processes, and one or more business configurations, and/or concrete instances of data objects and/or business objects that are relevant to a specific instance of a business scenario or a business process, and the like. A table can split across one or more data partitions 520, 522, 524, which can be accessible via a single server or server process, or alternatively via two or more parallel servers or server processes, for example as described below.

Figure 6:
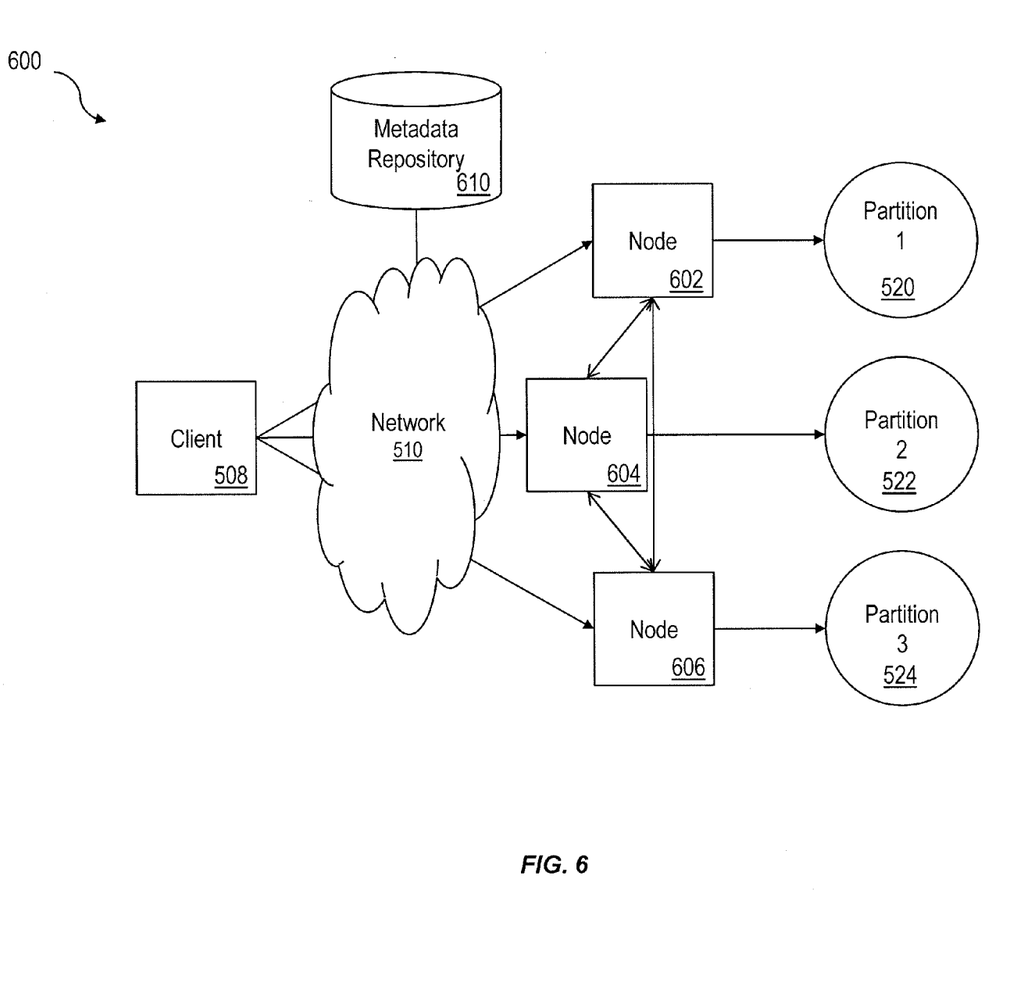
FIG. 6 is a diagram illustrating features of a independent index node partitioning approach consistent with at least some implementations of the current subject matter.

FIG. 6 shows an example of a multi-node data partitioning landscape 600 illustrating an approach to handling of data partitioned among multiple nodes in a multi-node system. As shown in FIG. 6, a client 508 can communicate with a receiving node, which can be any of a plurality of parallel nodes 602, 604, 606 that each handles at least one of a plurality of data partitions 520, 522, 524. The communication between the client 508 and the receiving node of the plurality of parallel nodes 602, 604, 606 can be via a direct connection or over a network 510 as is shown in FIG. 6. Upon receiving data, a request for data or for data processing, or the like (hereinafter referred to generically as a request) from a client machine 508, a data provider, a data consumer, or the like, the receiving node of the multiple nodes parallel nodes 602, 604, 606 examines the request and determines how the request must be directed to the available nodes based on the data partitioning in the data partitions 520, 522, 524. The receiving node then distributes the request to the other parallel nodes 602, 604, 606 as necessary. The client 508 can communicate with any one of the parallel nodes 602, 604, 606 or with more than one or with all of the parallel nodes 602, 604, 606. A metadata repository 610 or other passive resource storing metadata or other mapping data, rules, attributes, the partitioning specification or criteria, etc. can be accessible to one or more of the client 508 and the plurality of parallel nodes 602, 604, 606. The metadata repository 610 can be accessible via the network 510, as shown in FIG. 6, or via one or more of the plurality of parallel nodes 602, 604, 606 or by the client 508 via a dedicated or shared connection. A multi-level partitioning environment can in one example include two tables, one with a multi-level partitioning structure. On a first level, the two tables can have a same number of partitions, for example to ensure that related data are kept on a same processing node (server).

In one variation, the client 508 can be provided with a partitioning specification or criteria in advance of the request, such as for example hash functions, ranges, or other information necessary to direct the request to an appropriate one or more of the nodes 506. In such a case, the receiving node of the parallel nodes 602, 604, 606 can also perform a check of the request to ensure that the request or part of the request received by the receiving node is directed properly. In some variations, round robin partitioning can be used. For example, hash values and ranges need not be part of the partitioning plan. Rather, distribution of data storage among the data partitions 520, 522, 524 of the multiple parallel nodes 602, 604, 606 can be controlled by the client 508 itself (optionally via contact with the metadata repository 610 or other resource), which can be tasked to send at least approximately the same volume of data to each of the multiple parallel nodes 602, 604, 606. In this example, the client 508 can perform load balancing functions to at least approximately equalize the amount of data stored on each of the multiple parallel nodes 602, 604, 606.

Some implementations of the current subject matter can be used in conjunction with a multi-level partitioning approach. In one non-limiting example illustrated in FIG. 7, range partitioning according to months can be used to divide data records among multiple partitions on each of several parallel servers or data server processes. As shown in the framework 700 of FIG. 7, a database can be range partitioned into one partition for each month of the first quarter of a year. Accordingly, a level 7 first data partition 702 on a first data process server 704 is sub-partitioned into a level 2 first January partition 706, a level 2 first February partition, 708, and a level 2 first March partition 710. A level 1 second data partition 712 on a second data process server 714 is sub-partitioned into a level 2 second January partition 716, a level 2 second February partition, 718, and a level 2 second March partition 720.

Figure 7:
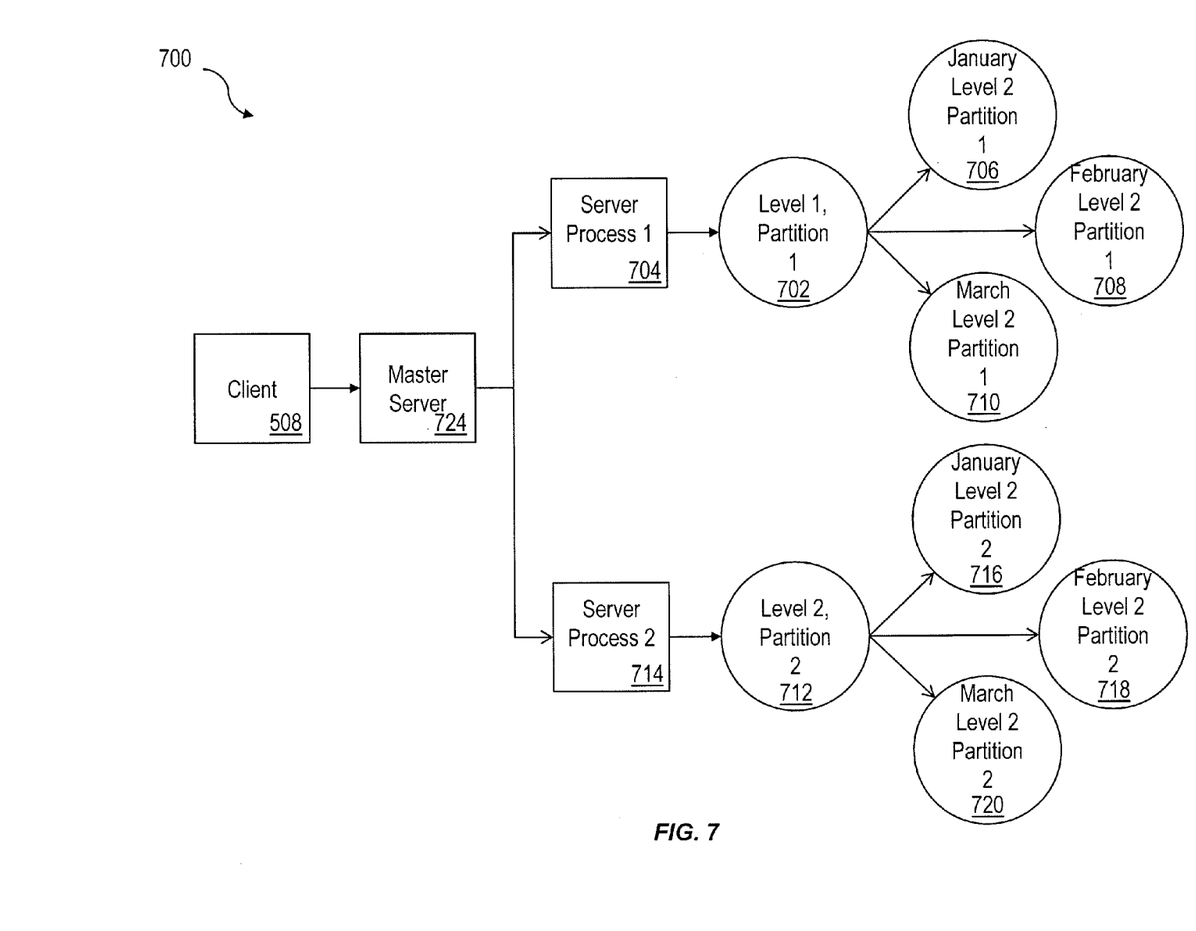
FIG. 7 is a diagram illustrating features of a multi-level partitioning approach consistent with at least some implementations of the current subject matter.

In the example illustrated in FIG. 7, the partitioning of data on the database between the level 1 first database partition 702 and the level 1 second database partition 712 can be accomplished using a hash partitioning approach in which a hash value is calculated for a data record using a hash function based on values for the data record in one or more columns of the database. FIG. 7 shows two server processes 704, 714 respectively hosting the two level 1 partitions 702, 712, but this simplified depiction is not intended as a limitation. Any number of parallel server processes with associated level 1 data partitions is within the scope of the current subject matter. Additionally, the first level partitioning need not be between two or more server processes but can instead be performed within a single server process.

FIG. 7 also shows a client 722 communicating with a master server 724 that can direct data requests and queries as well as new data to be stored to the appropriate one of the two or more level 1 data partitions 702, 712 on the two or more server processes 704, 714. In some implementations, the master server 724 can perform the calculation of the hash function to determine the hash value that dictates which of the server processes 704, 714 receives new data and where to find new data in response to a query or request. In other implementations consistent with aspects of the current subject matter, the client 722 can perform one or more of the above-noted functions of the master server 724 and can optionally eliminate the need for a separate master server 724 in distributing and maintaining data across two or more parallel server processes 704, 714. In still other implementations, the master server can be considered as a passive resource, for example a repository storing metadata or other data, rules, attributes, criteria, etc. that can be called by one or more or all of a standalone master server machine or machines, one or more index servers that can be co-located with one of the server processes 704, 714, the client 722, etc.

In addition, while the approach depicted in FIG. 7 employs hash partitioning to distribute data among the parallel server processes 704, 714 and range partitioning to further distribute data from each of the two or more level 1 partitions 702, 712 into second level partitions (e.g. sub-partitions), implementations using these or other partitioning approaches or other partitioning approaches (e.g. round robin partitioning) in a different order are also within the scope of the current subject matter. For example, range partitioning (or some other partitioning approach) can be used at the first level to distribute data among two or more parallel server processes, and hash partitioning (or some other partitioning approach different than the partitioning approach used at the first level) can be used at the second level. Range partitioning can be applied on any data that are amenable to being orders (e.g. postal codes, dates, phone numbers, catalog numbers etc.). The use of date values in range partitioning as discussed herein can be particularly advantageous in certain applications in which the date itself is a query value provided within a query of the database. In this case, the query itself can designate which level 2 partition needs to be searched to reply to the query. In still other implementations, multi-level partitioning can be performed within a single server process or physical server. In this manner, a multi-level partitioning tree structure can create multiple sub-partitions of the data storage with improved parallelism that can improve the efficiency of database operations such as indexing, merging, pruning, data retrieval, and the like.

Use of hash partitioning as the first partitioning method for the level 1 partitioning and range partitioning as the second partitioning method for the level 2 partitioning can be advantageous in enabling time-based partitioning without requiring that older data be frequently merged or compressed with newer data. In a conventional approach, data loaded into a table must eventually be merged into a main index. The timing of such a merge is typically based on the size of the main index. By partitioning at the second level according to a temporal range (e.g. month, week, year, or some other period of time), more recent (and therefore generally more frequently accessed) data records are kept together while older data records remain in partitions that do not need to be accessed (and therefore re-indexed and/or decompressed and re-compressed) as frequently.

Using hash partitioning, for example as the first partitioning method for the first level partition between the data sever processes, one or more columns containing line item numbers or some other key value that includes substantial variation among data records (varies a lot) can be chosen as the hash column. A hash value can be calculated based on the data record values in each of one or more columns using a hash function. If multiple columns are used, the hash function can include concatenation of the data record values in the multiple columns. The first partitioning method can optionally include round robin partitioning, range partitioning, or some other form or partitioning in other implementations.

The second partitioning approach, which can optionally include range partitioning (or can optionally include hash partitioning, round robin partitioning, or some other form of partitioning), can include evaluation of a second partitioning criteria based on one or more second columns, which do not include the one or more first columns used in evaluation of the first partitioning criteria. As such, while the first partitioning criteria can include a primary key value for the data record, the second partitioning criteria does not.

In further variations, an additional partitioning level can be used in addition to the level 1 and level 2 partitioning levels discussed above. For example, an additional layer can include an additional hash partitioning level. In some implementations, a third partitioning layer can be used, for example in place of history tables used to track changes to the database or one or more tables in the database.

One potential use for various implementations of the current subject matter can include handling of the database demands of an enterprise resource planning (ERP) system, other business software architecture, or other data-intensive computing application or software architecture. Such applications can, in some examples, be provided as a standalone, customized software installation that runs on one or more processors that are under the control of a specific organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. The diagram of FIG. 1 depicts an example of such a system.

Figure 8:
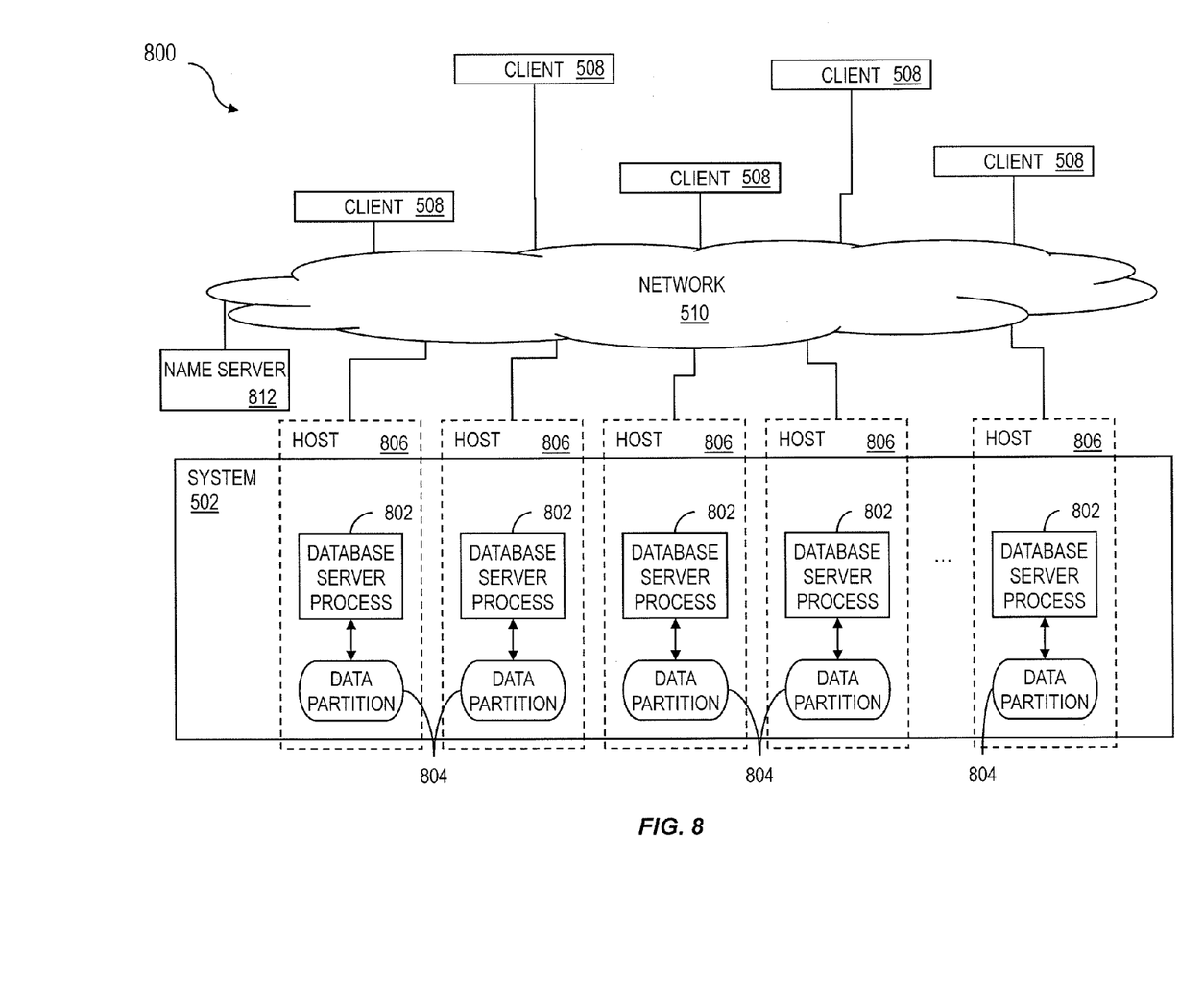
FIG. 8 is a diagram illustrating features of a database management system architecture consistent with at least some implementations of the current subject matter.

Alternatively or in addition, tables or ranges within tables can be assigned to different database partitions that are assigned to different hosts, for example data distribution and/or scalability reasons. FIG. 8 shows an example of an enterprise resource system architecture 800 consistent with an implementation that includes data distribution for scalability reasons. Such a configuration can be used for large, on-premise or stand-alone systems with high performance requirements. Each data server process 802 and its associated data partition 804 can be assigned to a discrete host 806. A host 806 can be a standalone machine with one or more physical processors or a virtual machine on a larger system 502 as depicted in FIG. 8. A central component, labeled as a name server 812 in FIG. 8, knows the topology of the system and how data is distributed. In a system with data distribution, the name server knows which tables or partitions of tables are located on which data server process 802. One or more clients 814 (e.g. client machines 508) can access the name server 812, either via a direct connection or over a network 816.

In a data distribution scenario, the partitioning can be done table wise or also by splitting tables. With table wise partitioning, the name server assigns new tables to a database server process 802 based on the current distribution of tables (number of tables assigned to each database server process 802). Then data for this table will reside only on that database server process 802. It is also possible to specify that a table is split over multiple database server processes 802. The name server 812 can optionally partition the table based on a size estimation specified by the application. When records are inserted into a split table, the records can be distributed to other database server processes 802 based on name server information.

Smaller organizations can also benefit from use of business software functionality. However, such an organization may lack the necessary hardware resources, IT support, and/or consulting budget necessary to make use of a standalone business software architecture product and can in some cases be more effectively served by a software as a service (SaaS) arrangement in which the business software system architecture is hosted on computing hardware such as servers and data repositories that are maintained remotely from the organization's location and accessed by authorized users at the organization via a thin client, such as for example a web browser, over a network.

In a software delivery configuration in which services of an business software system are provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 9:
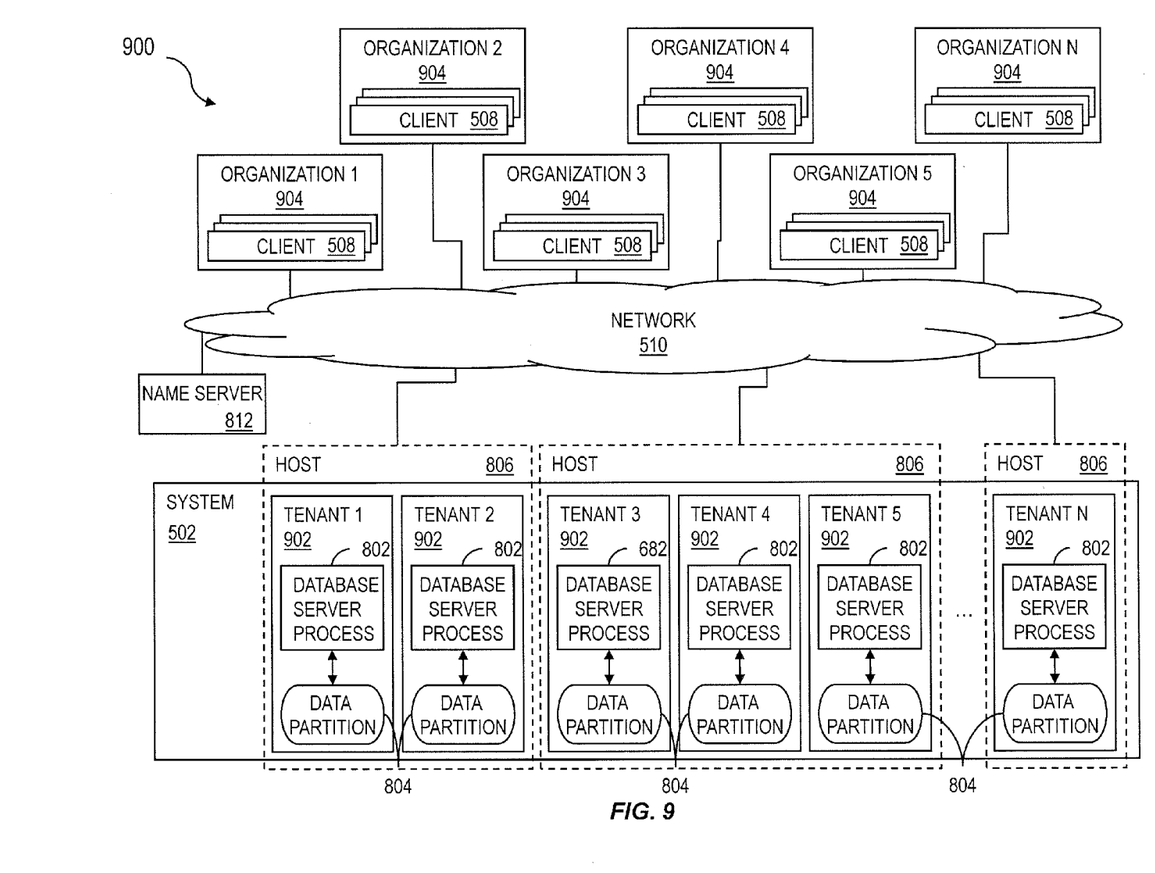
FIG. 9 is a diagram illustrating features of another database management system architecture consistent with at least some implementations of the current subject matter.

Data partitioning consistent with implementations of the current subject matter can also be used in a multi-tenancy environment as illustrated in the system architecture 900 of FIG. 9. Multiple tenants 902, each isolated from one another and available to be accessed by clients 814 within a separate organization 904 of a plurality of organizations via a network 816, can be hosted by a same host 806, which can be a virtual machine on a larger system 502 as shown in FIG. 9 or a separate system that includes one or more physical processors. Tenants 902 can also optionally be distributed across multiple database server processes 802 on more than one host 806. In this manner, tables or ranges within tables are assigned to different database server processes 802 that are assigned to different hosts 806 for scalability reasons. One or more tenants 902 can alternatively be served by a single database server process 802 accessing a data partition 804 (or multiple data partitions 804) for the respective tenant 902 that is isolated from other tenants 902.

To provide for customization of the business process for each of multiple organizations supported by a single software delivery architecture, the data and data objects stored by a database management system can include three types of content: core software platform content (e.g. a standard definition of a business process), system content, and tenant content. Core software platform content includes content that represents core functionality and is not modifiable by a tenant. System content can in some examples be created by the runtime of the core software platform and can include core data objects that store concrete data associated with specific instances of a given business process and that are modifiable with data provided by each tenant. The data retained in these data objects are tenant-specific: for example, each tenant of the group of tenants can store information about its own inventory, sales order, etc. Tenant content for isolated to each tenant of the group of tenants includes data objects or extensions to other data objects that are customized for one specific tenant of the group of tenants to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content can reflect tenant-specific modifications or changes to a standard template definition of a business process as well as tenant-specific customizations of the business objects that relate to individual process step (e.g. records in generated condition tables, access sequences, price calculation results, other tenant-specific values, or the like). A combination of the software platform content and system content and tenant content of a specific tenant of the group of tenants are accessed to provide the business process definition and/or the status information relating to a specific instance of the business process according to customizations and business data of that tenant such that each tenant of the group of tenants is provided access to a customized solution whose data are available only to users from that tenant.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The teen "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable storage medium storing instructions that, when executed by at least one programmable processor, cause the at least one programmable processor to perform operations comprising:
    receiving a table creation request pertaining to a created table in a database maintained on a multi-node data partitioning landscape that comprises a master node and a plurality of processing nodes, the plurality of processing nodes being controlled by the master node, the table creation request comprising a parameter specifying a number of partitions to be generated for the created table;
    querying a database controller for a currently available number of available processing nodes in the multi-node data partitioning landscape;
    comparing the currently available number of available processing nodes with the specified number of partitions to be generated for the created table;
    generating a plurality of data partitions for the created table according to the specified number of partitions, the generating further comprising:
    locating the generated plurality of data partitions across the available processing nodes according to a predetermined data load balancing partitioning specification to maximize even distribution of data in the created table if the currently available number of available processing nodes equals the specified number of partitions to be generated, and
    locating the generated plurality of data partitions across the available processing nodes according to other information in the table request creation if the currently available number of available processing nodes does not equal the specified number of partitions to be generated, the other information comprising semantic information regarding relationships between data in the generated plurality of data partitions and data in data partitions of at least one other table in the database, the locating according to the other information resulting in semantically related partitions of at least two tables in the database being collocated together, such that respective first data partitions of first and second tables in the database are located on a first of the currently available processing nodes, and respective second data partitions of the first and second tables are located on a second of the currently plurality of processing nodes; and
    storing partitioning information and mapping information associating each generated data partition of the generated plurality of data partitions in a metadata repository accessible to the master node and the plurality of processing nodes.

2. A computer program product as in claim 1, wherein the operations further comprise:
    receiving, by a recipient node of the plurality of processing nodes, a first data request, the first data request being received directly from a requesting machine without being handled by the master node;
    identifying, by the recipient node, a target node of the plurality of processing nodes to handle the data request, the identifying comprising the recipient node applying the partitioning information to identify one partition of the plurality of data partitions to which the first data request should be directed, and the mapping information associating each data partition of the plurality of data partitions with an assigned node of the plurality of processing nodes; and
    redirecting, by the recipient node, the data request to the target node so that the target node can act on the identified one partition in response to the data request.

3. A computer program product as in claim 1, wherein the generated plurality of data partitions are part of a multi-node data partitioning landscape comprising data partitioning over at least two partitioning levels, the table being further partitioned at a first level using a first partitioning specification and at a second level using a second partitioning specification.

4. A computer program product as in claim 1, wherein the created table is further partitioned at a first level into at least two first level partitions based on a first partitioning method, and each of the first level partitions is further partitioned at a second level into two or more second-level partitions based on a second partitioning method that is the same for all of the at least two first level partitions.

5. A system comprising:
    at least one programmable processor; and
    a machine-readable medium storing instructions that, when executed by the at least one programmable processor, cause the at least one programmable processor to perform operations comprising:
    receiving a table creation request pertaining to a created table in a database maintained on a multi-node data partitioning landscape that comprises a master node and a plurality of processing nodes, the plurality of processing nodes being controlled by the master node, the table creation request comprising a parameter specifying a number of partitions to be generated for the created table;

querying a database controller for a currently available number of available processing nodes in the multi-node data partitioning landscape;

comparing the currently available number of available processing nodes with the specified number of partitions to be generated for the created table;

generating a plurality of data partitions for the created table according to the specified number of partitions, the generating further comprising:

locating the generated plurality of data partitions across the available processing nodes according to a predetermined data load balancing partitioning specification to maximize even distribution of data in the created table if the currently available number of available processing nodes equals the specified number of partitions to be generated, and locating the generated plurality of data partitions across the available processing nodes according to other information in the table request creation if the currently available number of available processing nodes does not equal the specified number of partitions to be generated, the other information comprising semantic information regarding relationships between data in the generated plurality of data partitions and data in data partitions of at least one other table in the database, the locating according to the other information resulting in semantically related partitions of at least two tables in the database being collocated together, such that respective first data partitions of first and second tables in the database are located on a first of the currently available processing nodes, and respective second data partitions of the first and second tables are located on a second of the currently plurality of processing nodes; and storing partitioning information and mapping information associating each generated data partition of the generated plurality of data partitions in a metadata repository accessible to the master node and the plurality of processing nodes.

6. A system as in claim 5, wherein the operations further comprise:

receiving, by a recipient node of the plurality of processing nodes, a first data request, the first data request being received directly from a requesting machine without being handled by the master node;

identifying, by the recipient node, a target node of the plurality of processing nodes to handle the data request, the identifying comprising the recipient node applying the partitioning information to identify one partition of the plurality of data partitions to which the first data request should be directed, and the mapping information associating each data partition of the plurality of data partitions with an assigned node of the plurality of processing nodes; and redirecting, by the recipient node, the data request to the target node so that the target node can act on the identified one partition in response to the data request.

7. A system as in claim 5, wherein the generated plurality of data partitions are part of a multi-node data partitioning landscape comprising data partitioning over at least two partitioning levels, the table being further partitioned at a first level using a first partitioning specification and at a second level using a second partitioning specification.

8. A system as in claim 5, wherein the created table is further partitioned at a first level into at least two first level partitions based on a first partitioning method, and each of the first level partitions is further partitioned at a second level into two or more second-level partitions based on a second partitioning method that is the same for all of the at least two first level partitions.

9. A computer-implemented method comprising:

receiving a table creation request pertaining to a created table in a database maintained on a multi-node data partitioning landscape that comprises a master node and a plurality of processing nodes, the plurality of processing nodes being controlled by the master node, the table creation request comprising a parameter specifying a number of partitions to be generated for the created table;

querying a database controller for a currently available number of available processing nodes in the multi-node data partitioning landscape;

comparing the currently available number of available processing nodes with the specified number of partitions to be generated for the created table;

generating a plurality of data partitions for the created table according to the specified number of partitions, the generating further comprising:

locating the generated plurality of data partitions across the available processing nodes according to a predetermined data load balancing partitioning specification to maximize even distribution of data in the created table if the currently available number of available processing nodes equals the specified number of partitions to be generated, and locating the generated plurality of data partitions across the available processing nodes according to other information in the table request creation if the currently available number of available processing nodes does not equal the specified number of partitions to be generated, the other information comprising semantic information regarding relationships between data in the generated plurality of data partitions and data in data partitions of at least one other table in the database, the locating according to the other information resulting in semantically related partitions of at least two tables in the database being collocated together, such that respective first data partitions of first and second tables in the database are located on a first of the currently available processing nodes, and respective second data partitions of the first and second tables are located on a second of the currently plurality of processing nodes; and storing partitioning information and mapping information associating each generated data partition of the generated plurality of data partitions in a metadata repository accessible to the master node and the plurality of processing nodes.

10. A computer-implemented method as in claim 9, further comprising:

receiving, by a recipient node of the plurality of processing nodes, a first data request, the first data request being received directly from a requesting machine without being handled by the master node;

identifying, by the recipient node, a target node of the plurality of processing nodes to handle the data request, the identifying comprising the recipient node applying the partitioning information to identify one partition of the plurality of data partitions to which the first data request should be directed, and the mapping information associating each data partition of the plurality of data partitions with an assigned node of the plurality of processing nodes; and redirecting, by the recipient node, the data request to the target node so that the target node can act on the identified one partition in response to the data request.

11. A computer-implemented method as in claim 9, wherein the generated plurality of data partitions are part of a multi-node data partitioning landscape comprising data partitioning over at least two partitioning levels, the table being further partitioned at a first level using a first partitioning specification and at a second level using a second partitioning specification.

12. A computer-implemented method as in claim 9, wherein the created table is further partitioned at a first level into at least two first level partitions based on a first partitioning method, and each of the first level partitions is further partitioned at a second level into two or more second-level partitions based on a second partitioning method that is the same for all of the at least two first level partitions.

13. A computer-implemented method as in claim 9, wherein at least one of the receiving, the querying, the comparing, the generating, the locating, and the storing are performed by computer hardware.

* * * * *